(12) United States Patent
Luttenberger et al.

(10) Patent No.: US 12,174,008 B2
(45) Date of Patent: Dec. 24, 2024

(54) DEVICE AND METHOD FOR INSPECTING REFLECTIVE SURFACES

(71) Applicant: NEXTSENSE GMBH, Graz (AT)

(72) Inventors: Eduard Luttenberger, Heiligenkreuz am Waasen (AT); Clemens Gasser, Graz (AT); Albert Niel, Graz (AT)

(73) Assignee: NEXTSENSE GMBH, Graz (AT)

( * ) Notice: Subject to any disclaimer, the term of this patent is extended or adjusted under 35 U.S.C. 154(b) by 753 days.

(21) Appl. No.: 17/288,054

(22) PCT Filed: Sep. 4, 2019

(86) PCT No.: PCT/AT2019/060287
§ 371 (c)(1),
(2) Date: Apr. 23, 2021

(87) PCT Pub. No.: WO2020/082099
PCT Pub. Date: Apr. 30, 2020

(65) Prior Publication Data
US 2021/0396513 A1 Dec. 23, 2021

(30) Foreign Application Priority Data
Oct. 25, 2018 (AT) .............................. A 50927/2018

(51) Int. Cl.
*G01B 11/30* (2006.01)
*B01D 1/00* (2006.01)
(Continued)

(52) U.S. Cl.
CPC .......... *G01B 11/303* (2013.01); *B01D 1/0017* (2013.01); *B01D 1/16* (2013.01);
(Continued)

(58) Field of Classification Search
CPC .. G01N 21/8806; G01N 21/958; G01B 11/24; G01B 11/303; G01B 11/30; B01D 1/0017; B01D 1/16; B01D 1/22
See application file for complete search history.

(56) References Cited

U.S. PATENT DOCUMENTS

| 5,224,202 A * | 6/1993 | Arnold ................ C23C 16/4483 |
| | | 392/389 |
| 2015/0233708 A1 | 8/2015 | Gruhn |
| 2018/0320913 A1 | 11/2018 | Ser et al. |

FOREIGN PATENT DOCUMENTS

| DE | 195 06 642 | 3/1996 |
| DE | 197 55 643 | 6/1999 |

(Continued)

OTHER PUBLICATIONS

Int'l Search Report conducted in Int'l Appln. No. PCT/AT2019/060287 (Nov. 13, 2019).

(Continued)

*Primary Examiner* — Tarifur R Chowdhury
*Assistant Examiner* — Amanda Merlino
(74) *Attorney, Agent, or Firm* — GREENBLUM & BERNSTEIN, P.L.C.

(57) ABSTRACT

A device for inspecting a surface of an object, in particular a reflective or transparent surface, including an illuminating apparatus with which the surface can be illuminated, a measuring apparatus which senses light reflected at the surface, and a vapor-application apparatus which is designed to apply vapor to the surface. To achieve an efficient application of vapor, it is provided that the vapor-application apparatus includes a nozzle, a vaporization chamber having an enclosure, and a heating apparatus. The nozzle protrudes into the vaporization chamber in order to introduce a liquid into the vaporization chamber, and the vaporization chamber includes a vapor outlet.

20 Claims, 2 Drawing Sheets

(51) Int. Cl.
  *B01D 1/16*   (2006.01)
  *B01D 1/22*   (2006.01)
  *G01B 11/24*  (2006.01)
  *G01N 21/88*  (2006.01)

(52) U.S. Cl.
  CPC ............... *B01D 1/22* (2013.01); *G01B 11/24* (2013.01); *G01N 21/8806* (2013.01)

(56) References Cited

FOREIGN PATENT DOCUMENTS

| | | |
|---|---|---|
| DE | 101 08 221 | 9/2002 |
| DE | 10 2004 025 490 | 12/2005 |
| DE | 20 2016 007 328 | 1/2017 |
| EP | 2 908 093 | 8/2015 |
| EP | 3 306 235 | 4/2018 |
| GB | 342 447 | 2/1931 |
| JP | 2005-249487 | 9/2005 |

OTHER PUBLICATIONS

Austria Search Report conducted in counterpart Austria Appln. No. A 50927/2018 (Jul. 25, 2019).
China Search Report/Office Action conducted in counterpart China Appln. No. 201980070633.0 (Feb. 23, 2024).

* cited by examiner

DEVICE AND METHOD FOR INSPECTING REFLECTIVE SURFACES

The invention relates to a device for inspecting a surface of an object, in particular a reflective or transparent surface, comprising an illuminating apparatus with which the surface can be illuminated, a measuring apparatus which senses light reflected at the surface, and a vapor-application apparatus which is designed to apply vapor to the surface.

The invention also relates to a use of a device of this type.

In addition, the invention relates to a method for inspecting a surface of an object, in particular a reflective or transparent surface, preferably using a device according to the invention, wherein the surface is illuminated, a light reflected at the surface is sensed with a measuring apparatus, and vapor is applied to the surface by means of a vapor-application apparatus in order to produce a layer of liquid droplets on the surface.

From the prior art, devices for inspecting reflective surfaces of objects are known which are suitable for checking vehicle body parts, headlights, exterior mirrors, and the like. For example, documents DE 195 06 642 C1, EP 2 908 093 A1, DE 101 08 221 A1, and DE 10 2004 025 490 A1 each disclose devices and methods for optically sensing transparent objects, wherein in each case a homogeneous coat of liquid droplets is applied to the object surface for at least a duration of a measurement.

A disadvantage in this case is that a liquid is atomized and directly applied to the surface to thus produce a coat of individual liquid droplets on the surface. Alternatively, it is provided that the liquid is heated in a separate boiler and the vapor thus produced is fed to a vapor-application apparatus through lines, for example. It is therefore difficult to set an ideal droplet size in order to produce a homogeneous coat of liquid droplets on the object surface that is suitable for a measurement.

In addition, the vapor that is produced in a separate boiler must be conducted all the way to the vapor-application apparatus or the object through a line. To prevent the vapor from already condensing in the line, it is necessary that the vapor have a particularly high temperature and that the line also possibly be heated, which entails additional technical effort.

Furthermore, for the application of vapor to the surface in order to produce a coat, it has been determined that, among other things, the quality of the coat is dependent on a droplet size during the production of the vapor, for which reason not any arbitrary vapor-application apparatus or apparatus for producing a vapor is suitable for an inspection of this type.

It is therefore the object of the invention to specify a device of the type named at the outset which enables an efficient inspection of transparent or reflective surfaces and, at the same time, can be implemented in a small installation space.

A further object of the invention is to specify a use of a device of this type.

Furthermore, an object of the invention is to specify a method of the type named at the outset with which reflective or transparent surfaces can be inspected as efficiently as possible.

According to the invention, the first object is obtained in that, with a device of the type named at the outset, the vapor-application apparatus comprises a nozzle, a vaporization chamber having an enclosure, and a heating apparatus, wherein the nozzle protrudes into the vaporization chamber in order to introduce a liquid into the vaporization chamber, and wherein the vaporization chamber comprises a vapor outlet.

An advantage thereby obtained is in particular that the vapor can be produced directly in the vapor-application apparatus and that therefore no feed line for the vapor is required. The vapor is formed directly in the vaporization chamber and can be applied immediately to the surface of the object through the vapor outlet. The vapor outlet is essentially embodied as an opening in the enclosure, for example as a tubular opening. A temperature of the vapor can thus be kept low compared to a vapor that is produced in a boiler, for example, since this vapor does not need to survive a long distance from the vaporization chamber or the boiler all the way to the surface of the object. The vapor thus produced can condense on the surface of the object in order to form a homogeneous coat of liquid droplets. Furthermore, the coat lasts long enough that an optical measurement necessary for the inspection can be carried out. After the measurement, the coat vanishes on its own since the liquid droplets evaporate. Painted vehicle body parts, external mirrors, headlights, and the like, for example, can thus be inspected with a device of this type. An inspection of this type normally comprises a profile measurement and, where necessary, a check for scratches or other defects and production errors.

In addition, the device can comprise a robotic arm on which the illumination apparatus, the measuring apparatus, and/or the vapor-application apparatus are arranged, or can be mounted on such an arm. Alternatively, the illumination apparatus, the measuring apparatus, and/or the vapor-application apparatus can be positioned in a stationary manner. In this case, the robotic arm can be provided to position the object for a measurement or inspection. A further advantage is in particular that a device of this type can be embodied to be miniaturized and/or portable. The measuring apparatus can, for example, be embodied to acquire individual pieces of data or to acquire images. Typically, the measurement involves an illumination by means of the illumination apparatus, the application of vapor by means of the vapor-application apparatus, and the acquisition by means of the measuring apparatus. For this purpose, the measuring apparatus normally comprises a camera. The inspection can additionally involve an evaluation of measured data or acquired images.

It is preferably provided that the illumination apparatus supplies a light beam that can be adjusted for measurement. Alternatively, it can also be provided that the illumination apparatus supplies multiple light beams. For this purpose, the illumination apparatus can comprise multiple light sources, for example. Normally, the light beam or light beams are adjustable such that they are directed towards the surface during the measurement. It is furthermore beneficial if the illumination apparatus is embodied to supply monochromatic light. For this purpose, the illumination apparatus can comprise one or more laser light sources. In place of or in addition to the laser light source, a different light source, which supplies white light for example, can be provided in particular with parallelizing optics and preferably with a monochromator. The measuring apparatus is preferably embodied to sense one or more light beams reflected at the surface of the object.

It is advantageous if the heating apparatus is positioned to heat the enclosure. For this purpose, the enclosure of the vaporization chamber expediently comprises a thermally conductive material. Heat can thus be distributed to the entire housing of the vaporization chamber. On the one hand, an efficient heating of the liquid introduced into the vaporization chamber is thus enabled. On the other hand, through a homogeneous heating of the entire housing, it is ensured that the vapor does not already condense inside of the vaporization chamber, for example at the vapor outlet.

It is furthermore beneficial if the heating apparatus comprises at least one tubular and/or cylindrical heating element. It is thus ensured that the heating apparatus at least partially surrounds the vaporization chamber. Here, it can be provided that an inner wall is arranged between the heating apparatus or the at least one heating element and an interior space of the vaporization chamber. Alternatively, it can be provided that the at least one heating element itself constitutes the inner wall or a portion of the inner wall. Preferably, the at least one heating element is integrated into the enclosure of the vaporization chamber. Typically, the enclosure comprises the inner wall and an outer wall, wherein the at least one heating element is essentially flanked by the inner wall and the outer wall. Furthermore, it can be provided that multiple cylindrical heating elements are arranged in the enclosure or between the inner wall and the outer wall. For this purpose, it can be provided that the heating elements are inserted into corresponding cylindrical recesses in the enclosure.

Advantageously, it is provided that the nozzle comprises at least one spray outlet that is arranged essentially perpendicularly to the longitudinal axis of the nozzle. It has proven effective if the spray outlet is embodied in a circumferential manner so that the liquid is sprayed out essentially radially and thereby applied to the inner wall of the vaporization chamber. Alternatively, a plurality of spray outlets can be arranged in a radially circumferential manner at one end of the nozzle. Normally, the nozzle is embodied such that the liquid is atomized when it is introduced into the vaporization chamber. In addition, it can be provided that the nozzle has a spray angle that enables a wide-area wetting of the inner wall. Expediently, the nozzle is embodied such that, during an atomization of the liquid, a droplet size of less than 5 µm is achieved.

It is advantageous if the nozzle and the vapor outlet are arranged on opposite sides of the vaporization chamber. The liquid can thus be introduced into the vaporization chamber from one side, vaporized on the inner wall of the vaporization chamber, and conducted out of the vaporization chamber as vapor on a second side.

To enable a simple design, it can be provided that the vaporization chamber is embodied to be cylindrical, wherein the nozzle is arranged on a bottom surface and the vapor outlet is arranged on a top surface.

It is furthermore beneficial if the vapor outlet comprises a baffle. It is thus ensured that a liquid which may have condensed in the vaporization chamber does not drip out of the vapor outlet. This is important especially if the device is oriented with the vapor outlet facing downward and an object that is to be inspected is possibly arranged below the vapor-application apparatus. It is thereby prevented that the liquid drips onto the object and the inspection is interfered with. The vapor-application apparatus is oriented facing downward when, as a result of gravity, the liquid which has condensed in the vaporization chamber flows to that end of the vaporization chamber at which the vapor outlet is arranged. This includes both vertical and also diagonal arrangements.

In addition, it is expedient if the nozzle is in fluid connection with multiple feed lines, in particular with a liquid feed line, a spray air feed line, and/or a control air feed line. It is thus ensured that all fluids which are required for a successful application of vapor can be supplied. These typically include the liquid, a spray air, and optionally a control air. In this case, the spray air is essentially used for spraying in the liquid. With the control air, the spraying-in can additionally be controlled.

Finally, it is beneficial if the feed lines each comprise a dispenser. Preferably, the dispensers each comprise at least one valve. As a result, the supply of liquid as well as the supply of spray air and/or control air can be regulated.

The further object is obtained by utilizing the aforementioned advantages with a use of a device of this type to inspect vehicle parts. Vehicle parts can comprise in particular reflective or transparent surfaces, as is the case with mirrors, windshields, or painted auto parts, for example.

Finally, the method-related object is attained with a method of the type named at the outset in that a liquid is introduced into a vaporization chamber having an enclosure, wherein the enclosure is heated and the liquid is sprayed onto an inner wall of the enclosure, whereupon the liquid vaporizes and a vapor is conducted out of the vaporization chamber via a vapor outlet and is condensed on the surface of the object.

An advantage obtained with the method of the invention is in particular that the vapor is produced at a short distance from the object. Accordingly, the vapor does not need to be conducted to the object via a line, for which reason it can have a relatively low temperature. In addition, there is no need to heat a line in order to prevent a premature condensation of the vapor in the line.

To enable an efficient inspection of the surface, it can be provided that vapor is applied to a region having a diameter of at least 50 mm, in particular of 70 mm to 80 mm, on the surface of the object. During an application of vapor, the vapor condenses on the surface and in this region forms a, preferably homogeneous, coat of individual liquid droplets.

Advantageously, it is provided that a spray air and/or the liquid are introduced into the vaporization chamber, wherein the spray air is optionally introduced first for at least 25 ms, preferably for approximately 50 ms, after which the liquid is admixed for approximately 100 ms to 200 ms. Normally, the spray air and/or the liquid are sprayed into the vaporization chamber.

Typically, the spray air is first introduced for a specific amount of time, after which the liquid is admixed. A uniform distribution of the liquid in the vaporization chamber is thus achieved.

It is furthermore beneficial if the vaporization chamber is first filled with spray air, after which the liquid is mixed with the spray air in the nozzle and a mixture of this type is introduced into the vaporization chamber.

In order to be able to respond to a change in environmental conditions, such as the temperature, the humidity, or the like, for example, during operation of the device, it can be provided that parameters of the vapor-application apparatus are regulated as a function of quality criteria determined from acquired measurement data. Normally, quality criteria such as an image contrast, an image brightness, a linear detectability, and the like, for example, can be determined from the measurement data or images that were acquired using the measuring apparatus. It can then be expedient if parameters of the vapor-application apparatus are set such that the quality criteria respectively exhibit a desired value or are satisfied. Parameters of this type can, for example, be a supplied amount or volume of the fluids, wherein each parameter can be regulated separately. The supplied fluids comprise in particular the liquid as well as the spray air and control air. Optionally, and in particular for a regulation of this type, it can be provided that the device comprises a control unit with which the parameters of the vapor-application apparatus can be set. Preferably, a feedback loop is provided which is possibly connected to the control unit.

Furthermore, it can be provided that additional data, in particular climatic data such as temperature, humidity and the like, for example, are measured in order to correct parameters of the vapor-application apparatus where necessary. These additional data can in this case be used for a correction of the parameters of the vapor-application apparatus. Advantageously, at least one additional sensor, in particular a moisture sensor and/or a temperature sensor, is provided for this purpose.

Additional features, advantages, and effects follow from the exemplary embodiments described below. In the drawings which are thereby referenced:

Figure 1:
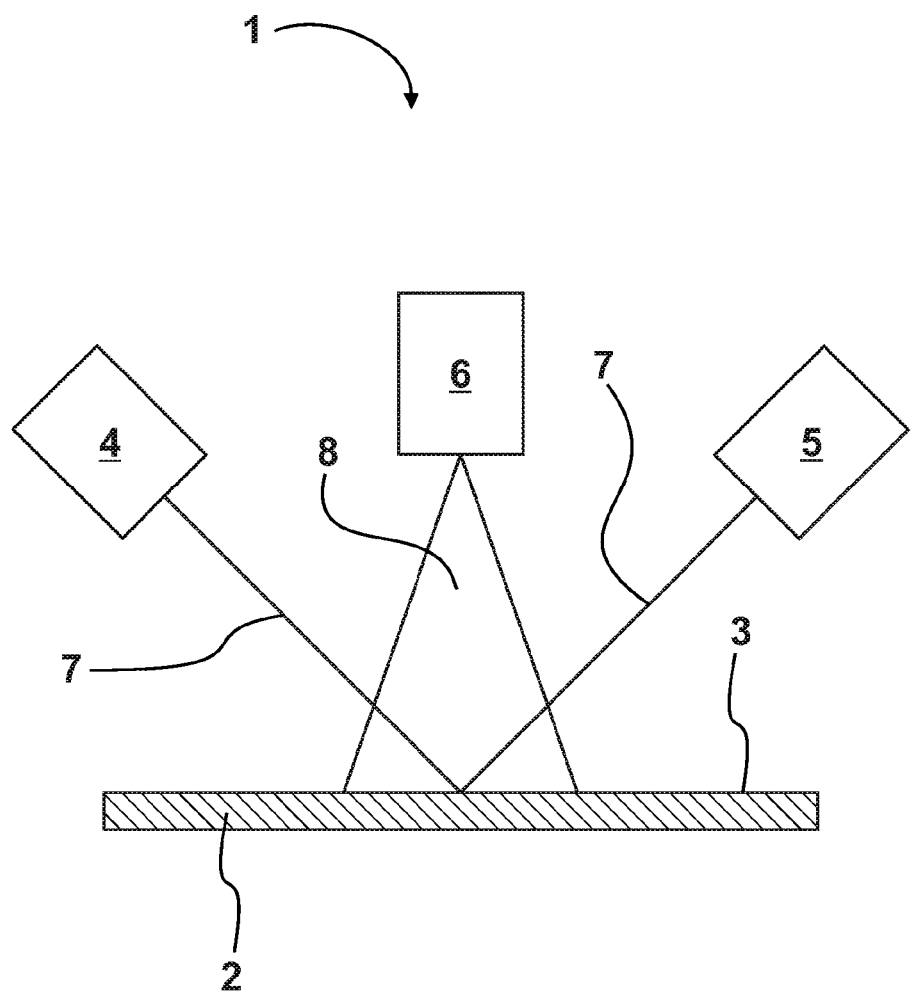
FIG. 1 shows a schematic illustration of a device according to the invention.

FIG. 1 shows a schematic illustration of a device 1 according to the invention and a surface 2 of an object 3 that is to be inspected. The device 1 essentially comprises an illumination apparatus 4, a measuring apparatus 5, and a vapor-application apparatus 6. The illumination apparatus 4, the measuring apparatus 5, and the vapor-application apparatus 6 can, for example, be arranged on a shared base or can be connected to one another in any desired manner. The device 1 preferably comprises a robotic arm on which components of the device 1 are mounted. The arrangement shown in FIG. 1 is to be considered exemplary, since essentially any desired arrangement of individual components is possible. Expediently, the components are arranged such that, starting from the illumination apparatus 4, an incident light beam 7 is directed towards the object 3, which light beam 7 is reflected at the surface 2. A reflected light beam 7 is then sensed by the measuring apparatus 5. As is evident from FIG. 1, the incident light beam 7 is aligned such that it strikes the surface 2 of the object 3 in a region to which vapor is applied. Furthermore, a vapor 8 is illustrated which exits from the vapor-application apparatus 6 and is applied to a defined region on the surface 2 of the object 3.

Figure 2:
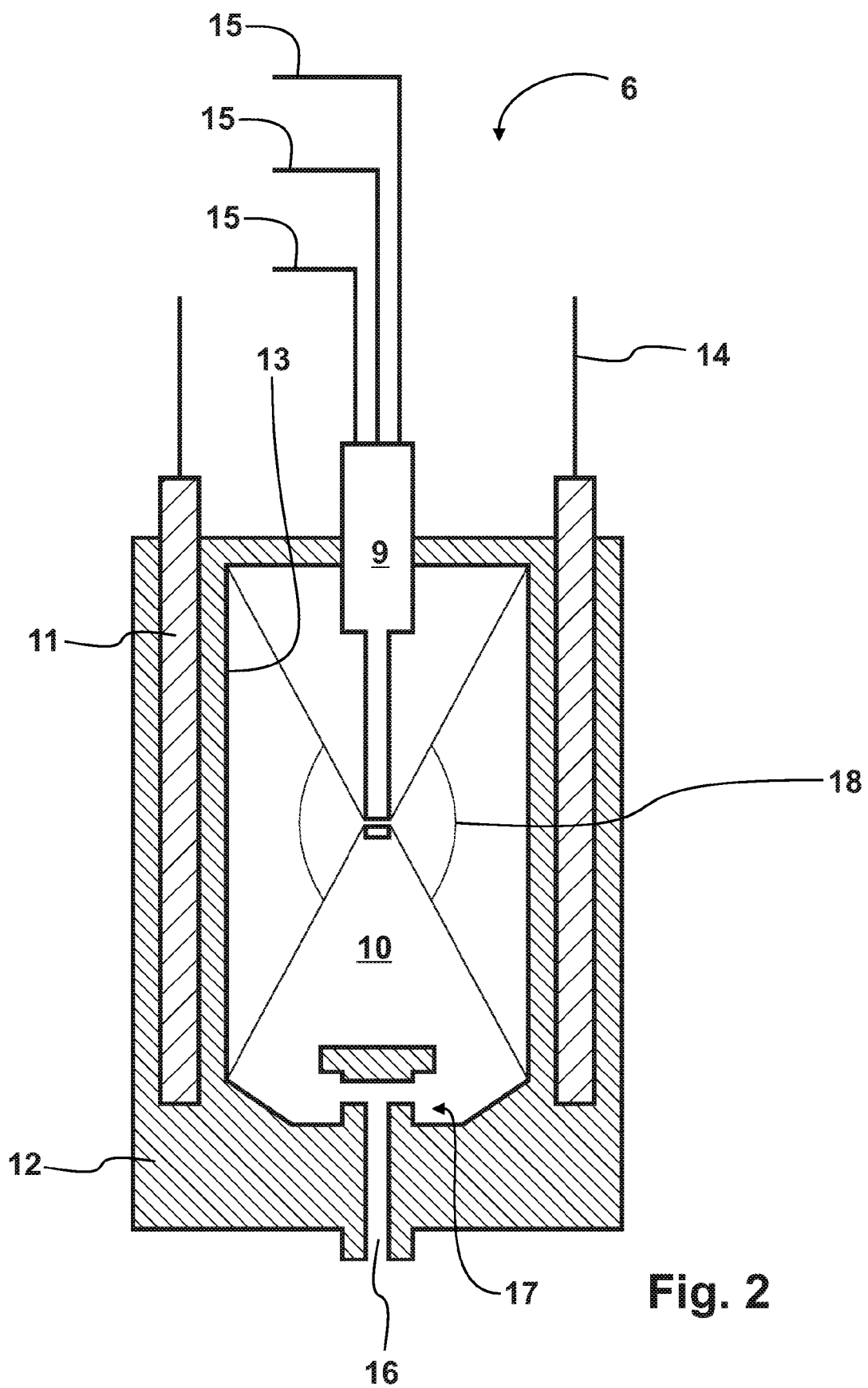
FIG. 2 shows a cross-sectional illustration of a vapor-application apparatus.

In FIG. 2, a vapor-application apparatus 6 is illustrated which comprises a nozzle 9, a vaporization chamber 10, and a heating apparatus 11. The vaporization chamber 10 essentially comprises an enclosure 12, wherein an interior space of the vaporization chamber 10 is laterally bounded by one or more inner walls. Preferably, the vaporization chamber 10 and/or the enclosure 12 are embodied to be cylindrical, wherein the inner wall 13 corresponds to an inner envelope surface.

As is shown in FIG. 2, the nozzle 9 can be arranged such that it protrudes into the vaporization chamber 10 or into the interior space, in particular in the region of a top surface. In addition, the heating apparatus 11 is positioned such that the inner wall 13 is arranged between the heating apparatus 11 and the interior space. The heating apparatus 11 can, for example, comprise an electric heating element which comprises an electrical connection 14. In the embodiment illustrated, the heating apparatus 11 is embodied with a heating element that runs around the interior space of the vaporization chamber 10. The heating element is normally embodied to be tubular for this purpose. For a supply of fluid, the nozzle 9 comprises multiple, in particular three, feed lines 15, wherein one liquid feed line, one spray air feed line, and one control air feed line are normally provided.

In addition, in the region of a bottom surface, a vapor outlet 16 is typically provided which is normally embodied as an opening in the enclosure 12. Alternatively, an opening is provided in the bottom surface, into which opening an insert having a central channel can be inserted. Thus, a diameter of the vapor outlet 16 can be modified by means of different inserts. In the embodiment illustrated in FIG. 2, however, the vapor outlet 16 is embodied in one piece with the enclosure 12. At an inner end of the vapor outlet 16, a baffle 17 is provided in which a condensed liquid can collect when the vapor-application apparatus 6 is arranged with the vapor outlet 16 oriented downwards as shown in FIG. 2.

To apply vapor to a surface 2, a spray air is first introduced into the nozzle 9 through the spray air feed line and subsequently introduced into the vaporization chamber 10. After this, a liquid such as water or ethanol, for example, is admixed through the liquid feed line and is likewise introduced into the vaporization chamber 10 through the nozzle 9. It has proven effective if the spray air is in this case introduced for at least 25 ms, preferably for approximately 50 ms. Here, the liquid is typically atomized and sprayed into the interior space of the vaporization chamber 10 radially at a defined spray angle 18. The spray angle 18 is advantageously set such that the liquid or fine liquid droplets are applied to the inner wall 13 over a wide area. The liquid droplets are vaporized as soon as they strike the inner wall 13, which is heated by the heating apparatus 11. The vapor 8 produced then flows out of the vaporization chamber 10 through the vapor outlet 16. Here, the vapor-application apparatus 6 is preferably arranged such that the vapor 8 is immediately applied to the surface 2 of the object 3 through the vapor outlet 16 and a coat of liquid droplets can thus be applied.

To enable an efficient inspection of a surface 2, the spray air is typically introduced first into the vaporization chamber 10. In a further step, the liquid is admixed with the spray air in the nozzle 9 and is likewise introduced into the vaporization chamber 10. The liquid is sprayed out radially via the spray outlet or spray outlets of the nozzle 9. A plurality of liquid droplets is thereby applied to the inner wall 13 of the vaporization chamber 10. For this purpose, the nozzle 9 comprises multiple spray outlets that are arranged in a radially circumferential manner, or comprises one radially circumferential spray outlet. In addition, the inner wall 13 of the vaporization chamber 10 is heated by means of the heating apparatus 11 so that the liquid droplets vaporize essentially immediately upon impact with the inner wall 13. The vapor 8 thus obtained is conducted out of the vaporization chamber 10 through the vapor outlet 16 and essentially directly onto the surface 2 of the object 3 in order to be applied thereto.

Thus, during the application of vapor to the surface 2, the vapor 8 is conducted onto the surface 2, where it condenses and forms the coat of liquid droplets. As a result, the surface 2, in particular a transparent or reflective surface 2, becomes cloudy, whereby reflected light can be sensed by the measuring apparatus 5, which ultimately enables the efficient inspection of the surface 2 with regard to a profile measurement as well as defects such as scratches, for example.

The invention claimed is:

1. A device for inspecting a surface of an object comprising:

an illumination apparatus configured to illuminate the surface;

a measuring apparatus which senses light reflected at the surface; and a vapor-application apparatus which is designed to apply vapor to the surface, wherein the vapor-application apparatus comprises a nozzle, an enclosure having a vaporization chamber, and a heater arranged to heat the enclosure, wherein the nozzle protrudes into the vaporization chamber in order to introduce a liquid into the vaporization chamber to spray an inner wall of the vaporization chamber, and wherein the vaporization chamber comprises a vapor outlet by which vapor created in the vaporization chamber is directly applied to the surface of the object.

2. The device according to claim 1, wherein the illumination apparatus supplies a light beam that is adjustable for measurement.

3. The device according to claim 1, wherein the heater comprises at least one of a tubular or a cylindrical heating element.

4. The device according to claim 1, wherein the nozzle comprises at least one spray outlet that is arranged essentially perpendicularly to a longitudinal axis of the nozzle.

5. The device according to claim 1, wherein the nozzle and the vapor outlet are arranged on opposite sides of the vaporization chamber.

6. The device according to claim 1, wherein the vaporization chamber is embodied to be cylindrical, and wherein the nozzle is arranged on a bottom surface of the vaporization chamber and the vapor outlet is arranged on a top surface of the vaporization chamber.

7. The device according to claim 1, wherein the vapor outlet comprises a baffle.

8. The device according to claim 1, wherein the nozzle is in fluid connection with multiple feed lines comprising at least one of a liquid feed line, a spray air feed line, or a control air feed line.

9. The device according to claim 8, wherein the feed lines each comprise a dispenser.

10. A process of inspecting vehicle parts with the device according to claim 1.

11. A method for inspecting a surface of an object using the device according to claim 1, the method comprising:

illuminating the surface;

sensing the light reflected at the surface with the measuring apparatus; and applying vapor to the surface by the vapor-application apparatus in order to produce a layer of liquid droplets on the surface, and wherein the enclosure is heated and the liquid is introduced into the vaporization chamber and sprayed onto an inner wall of the heated enclosure, whereupon the liquid vaporizes and the vapor is conducted out of the vaporization chamber via the vapor outlet and is condensed on the surface of the object.

12. The method according to claim 11, wherein vapor is applied to a region having a diameter of at least 50 mm on the surface of the object.

13. The method according to claim 12, wherein vapor is applied to a region having a diameter of 70 mm to 80 mm on the surface of the object.

14. The method according to claim 11, wherein at least one of spray air or the liquid are introduced into the vaporization chamber, and wherein the spray air is introduced first for at least 25 ms, after which, the liquid is admixed for approximately 100 ms to 200 ms.

15. The method according to claim 14, wherein the spray air is introduced first for approximately 50 ms.

16. The method according to claim 11, wherein parameters of the vapor-application apparatus are regulated as a function of quality criteria determined from acquired measurement data.

17. The method according to claim 11, wherein additional data, are measured in order to correct parameters of the vapor-application apparatus.

18. The method according to claim 17, wherein the additional data comprises climatic data including at least one of temperature or humidity.

19. The method according to claim 12, wherein the surface of the object is one of reflective or transparent.

20. The device according to claim 1, wherein the surface of the object is one of reflective or transparent.

* * * * *